United States Patent [19]

Malakhoff

[11] 4,254,842
[45] Mar. 10, 1981

[54] INTERPLANER HINGE JOINT FOR SES SEALS

[75] Inventor: Alexander Malakhoff, Arlington, Va.

[73] Assignee: The United States of America as represented by the Secretary of the Navy, Washington, D.C.

[21] Appl. No.: 88,897

[22] Filed: Oct. 29, 1979

[51] Int. Cl.³ .................................................. B60V 1/04
[52] U.S. Cl. ...................................... 180/126; 180/125; 114/67 A
[58] Field of Search ............... 180/116, 117, 118, 119, 180/120-125, 126, 127, 128-130; 114/67 A

[56] References Cited

U.S. PATENT DOCUMENTS

| | | | |
|---|---|---|---|
| 3,532,180 | 10/1970 | Ford | 180/126 |
| 3,987,865 | 10/1976 | Krupp | 180/127 |
| 4,083,425 | 4/1978 | Rickards | 180/126 X |
| 4,137,987 | 2/1979 | Plackett | 180/126 |

Primary Examiner—John J. Love
Assistant Examiner—Randall A. Schrecengost
Attorney, Agent, or Firm—R. S. Sciascia; Marsh L. A.; W. W. Randolph

[57] ABSTRACT

In an Air Cushion Vehicle having spaced depending sidewalls, a seal structure which includes an inflatable bag secured to the hull and a plurality of juxtaposed pivotally interconnected planer members maintained in operative position beneath the bag by a plurality of support stays. The support stays are connected to the hull and extend along the longitudinal edge portions of the planer members and are connected to the hinge members, which pivotally interconnect the planer members, to adjustably secure the planer members to the support stays. Fixed length geometry straps and adjustable length retracting straps are connected to the hinge members for limiting the downward deflection of the aft end of the planer members.

8 Claims, 6 Drawing Figures

INTERPLANER HINGE JOINT FOR SES SEALS

The invention described herein may be manufactured and used by or for the Government of the United States of America for governmental purposes without the payment of any royalties thereon or therefor.

BACKGROUND OF THE INVENTION

Surface Effects Ships (SES) of the type referred to as Captured Air Cushion Vehicles utilize a pressurized air bubble to maintain the vehicle above the surface of the ground or water. In marine vessels the pressurized air is maintained beneath the vessel in a plenum chamber defined between a pair of spaced depending sidewalls with bow and stern seals extending therebetween. Problems affecting performance of such vessels include the loss of pressurized air from the plenum chamber around the seals and the effect of large drag and impact forces exerted on the seals by the waves. Although various types of seal structures have been proposed which address these problems, the increased size and speed requirements of the new generation of large SES vessels, such as those currently being developed by the Navy, have precluded application of many proposed seal designs to such vessels. For example, design parameters for large SES vessels generally require a large, lightweight and flexible seal structure having rapid response characteristics to accommodate rapid variations in the water surface at high speeds. Further, the seal structures must be durable enough to endure impact and seal weight loads imposed thereon under severe sea state conditions.

A particular example of a proposed seal structure for large SES vessels is disclosed in U.S. Pat. No. 4,137,987 granted to M. Plackett. The Plackett seal generally comprises a flexible membrane transversely secured between two spaced sidewalls and a planer seal portion of juxtaposed planer members, or planers connected to the hull. These planer members depend in front of and extend beneath the flexible membrane. The planers are designed to act as planer surfaces for riding over the surface or wave discontinuities and to isolate the impact forces generated on the planers from the vessel. This is generally accomplished by supporting the free end portions of the planers with flexible supports which permit deflections in the fore and aft as well as in the up and down directions. A biasing or equilibrium means for causing the planers to return to a predetermined equilibrium position is provided by the inflatable membrane which, upon inflation, exerts an outward pressure on the forward end portion of the planer members. However, large scale seal structures, utilizing the planers embodied in the Plackett patent, have proved to be rather heavy and due to their weight and stiffness characteristics are subject to severe slamming loads as the planers encounter the waves at high speeds. Further, the heavy weight of the long planers tends to cause the seal structure to be highly stressed under severe operating conditions, such as "snap back". Snap back of the planers occurs after the lower part of the seal is forced toward the hull by a wave which, as the wave passes the seal structure, causes a gap between the lower portion of the seal and the surface of the water. Under the influence of gravity and the cushion pressure the planers accelerate toward the water until they are restrained or "snatched" by the support straps, thus exerting severe stresses in the support straps and the planer structure. Attempts to strengthen the planers tended to reduce the flexibility of the planers, which resulted in less responsive planers that, accordingly, induced higher impact forces thereon. Additionally, the interplaner joints between the juxtaposed planers have been found to be subject to undesirable tearing and chafing damage due to the relative motion between the adjacent planers. For example, the centrally supported planers permit an undesirable transverse wobble of the planers which increases the stress and strain on the interplaner joints.

SUMMARY OF THE INVENTION

The instant invention provides an improved seal structure for a marine air cushion vehicle which overcomes drawbacks encountered with the prior art. The seal structure includes a flexible membrane in the form of an inflatable bag secured to the hull for sealing the transverse space between the sidewalls and a plurality of elongated planer members or planers positioned in juxtaposed relationship between the spaced sidewalls. The planers are pivotally interconnected along their longitudinal edge portions. The planers are also adjustably connected to a plurality of support cables or stays which are secured to the hull and extend longitudinally between the sidewalls. An additional support means for the planers is provided in the form of a plurality of nonadjustable geometry straps, which set the position of the seal structure, and a plurality of retracting straps. These straps extend from the hull structure and are connected to the planers for limiting the downward deflection of the planers to a predetermined position.

Preferably, the means interconnecting the adjacent planers comprise flanges spaced along the longitudinal edge portions of the planers and hinge members pivotally interconnecting the corresponding flanges on the adjacent planers. The hinge members include clamping elements for adjustably securing the hinge members which in turn secure the planers to the stays. Thus, the planers can be positioned to assume a preselected longitudinal configuration between the sidewalls.

According to another feature of the invention, the retracting and geometry support straps are pivotally connected to the means interconnecting the adjacent planar members to reduce the tendency of the planers to undergo wobble and torsional motions. In the particular arrangement wherein the retracting straps are adjustable and the hinge members can be longitudinally adjusted along the stays, the planers can be adjusted to assume a plurality of operative positions.

Accordingly, a general object of the present invention is to provide a seal structure for a large, high speed air cushion vehicle capable of operating efficiently under a variety of water surface or sea state conditions.

Another object of this invention is the provision of a seal structure which is balanced by dynamic pressure loads to automatically adjust to variations in the contour of the supporting water surface.

A further object of the present invention is to provide a high speed seal structure which permits efficient and smooth operation of the vessel without causing undue impact effects thereon.

Yet another object of this invention is the provision of an economically designed seal structure which has flexibility and response characteristics to rapidly respond in a variety of water or sea state conditions.

Still another object of the invention is to provide a seal structure of efficiently interconnected planar members wherein such members are supported along their longitudinal edge portions to reduce the effect of impact stresses thereon.

DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompany drawings, in which:

DETAILED DESCRIPTION OF THE INVENTION

Figure 1:
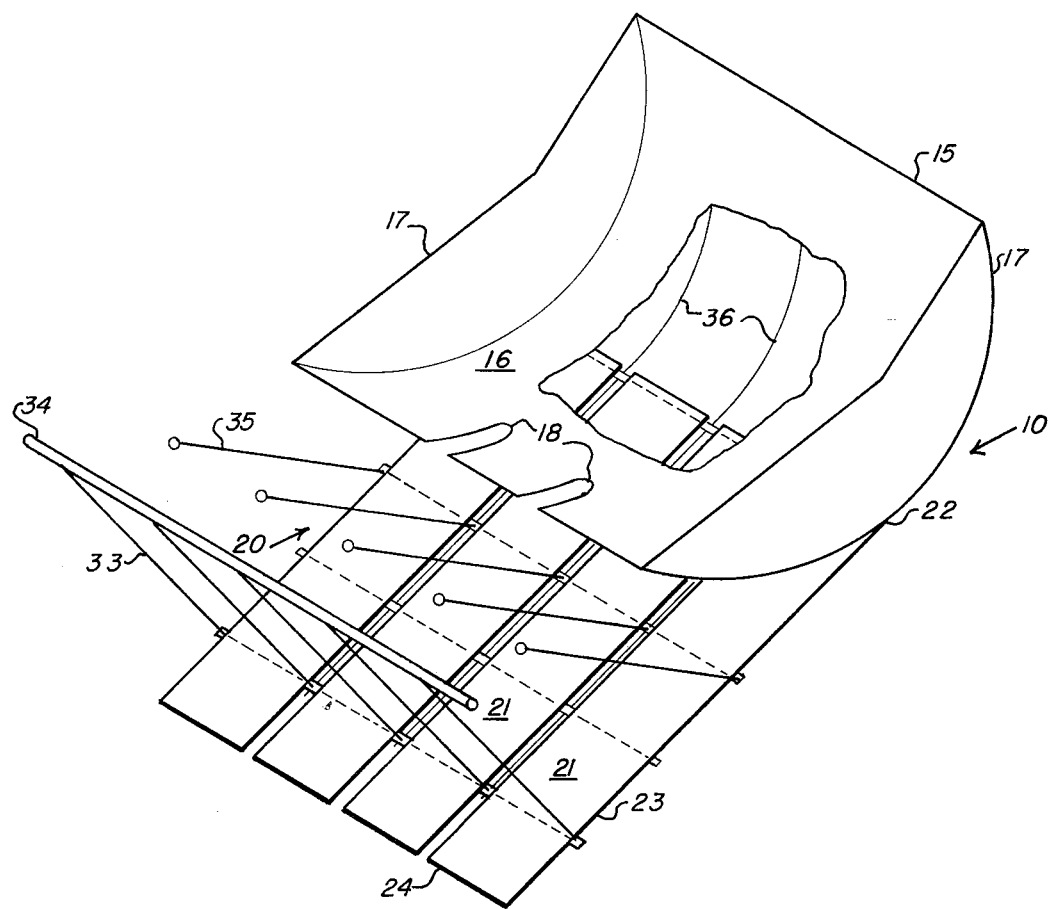
FIG. 1 is a perspective view of the seal structure according to the invention, wherein a portion thereof is broken away.

Referring now to FIG. 1, there is shown a perspective view of a seal structure 10 which, in this particular instance, is particularly designed for the bow of an air cushion vehicle to seal the forward end of a plenum chamber. Such vehicles commonly include a hull with spaced depending rigid sidewalls extending the length of the vessel with bow and stern seal structures constructed to extend transversely between the sidewalls and respectively seal the bow and stern portions of the plenum chamber. As shown in FIG. 1, the seal structure 10 is of the planar type including an upper portion comprising a flexible membrane or bag structure 15 and a lower planar portion 20 designed to ride over the surface of the water in a manner similar to a water ski. In performing this function, the planar portion 20 is designed to undergo up and down as well as fore and aft motions in response to both the wave motions and the resulting drag forces imposed on the planar portion 20. To accommodate such motions, a flexible support arrangement is utilized comprising adjustable retracting straps 33 and geometry straps 35, each extending from the hull of the vessel and connected to the individual planar members 21 of the planar portion 20. The support arrangement also includes a plurality of support cables or stays 36 attached to the hull and extending in front of and beneath the inflatable bag 15 where the stays 36 are adjustably connected to the planers 21.

The inflatable membrane or bag 15 is designed to exert an outward pressure on the stays 36 to bias and return the planers 21 to a predetermined operative position when intermittent wave actions displaces the planers 21. The internal pressure for the inflatable bag 15 may be supplied by various means and arrangements. In the preferred embodiment pressurized air is introduced from the hull into a chamber 16 defined between the hull and the inflatable bag 15 which includes end caps 17 in contact with the hull and the sidewalls. Aperatures 18 are formed in the bag 15 to permit venting of the pressurized air into and from the chamber 16 as the inflatable bag 15 undergoes intermittent localized deformation due to the action of the waves.

Figure 2:
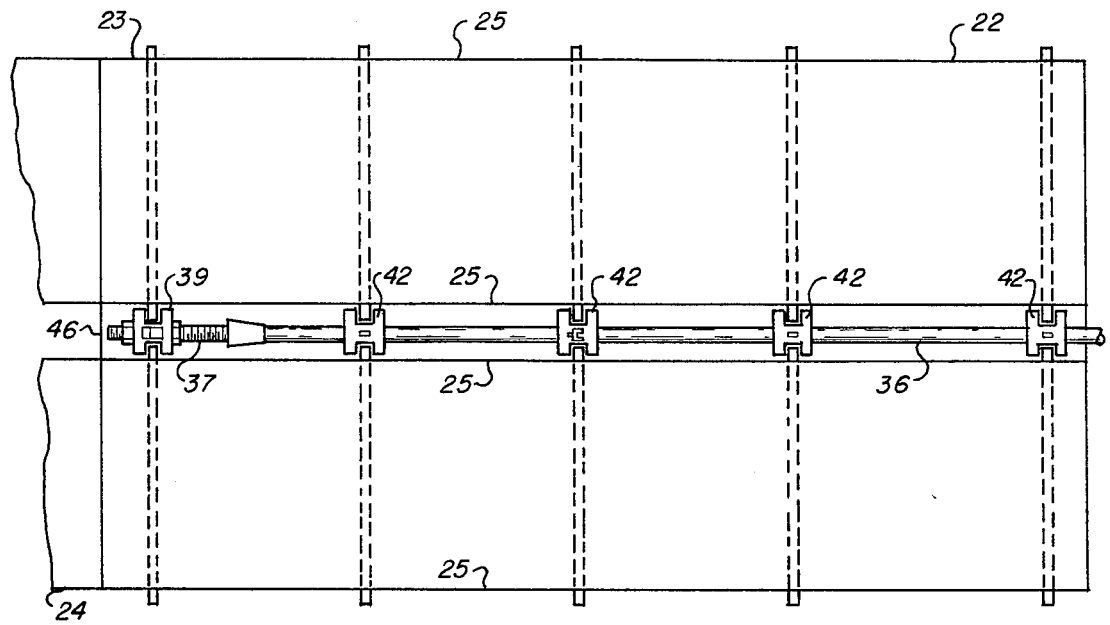
FIG. 2 is a top view of a portion of two pivotally interconnected planers.
Figure 4:
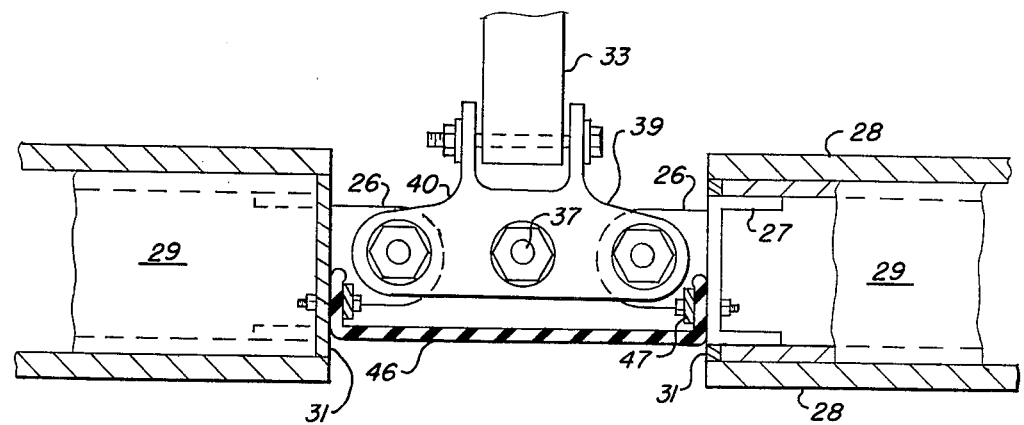
FIG. 4 is an end view of the end connection of FIG. 3 taken along lines 4—4 of FIG. 3, with a portion of the stiffener broken away.
Figure 5:
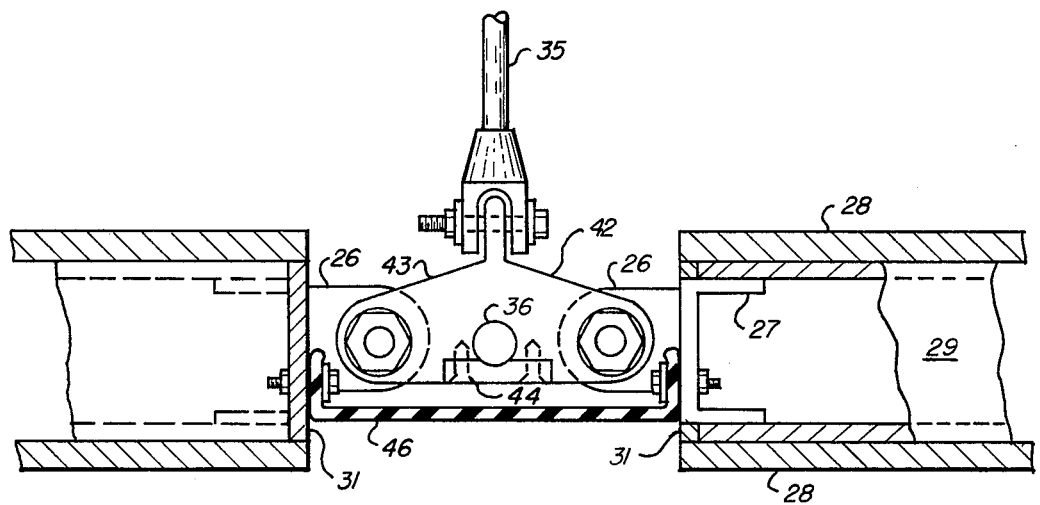
FIG. 5 is an end view of an intermediate connection for adjacent planers with a portion of the stiffener broken away.
Figure 6:
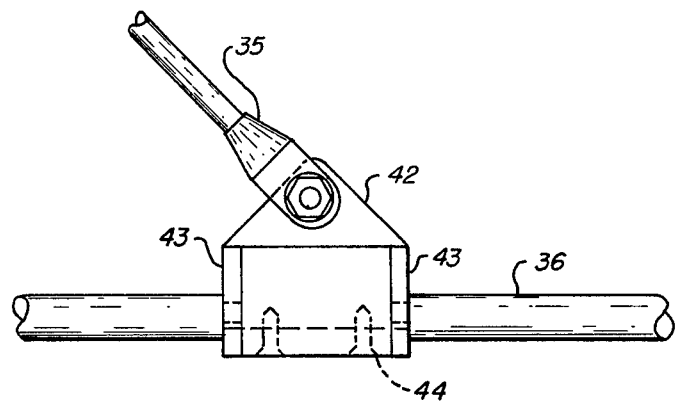
FIG. 6 is a side view of the hinge member of FIG. 5.

As generally shown in FIGS. 1 and 2, the planers 21 are secured to the spaced support stays 36 at periodic intervals along their longitudinal edge portions 25. Although not restricted thereto, in the preferred embodiment a stay 36 is positioned along the longitudinal edge portion 25 of each planer 21 and the planers 21 are pivotally connected to the stays 36 to permit a folding or pivoting action therebetween. As more particularly shown in FIGS. 3–5, the means for pivotally interconnecting the adjacent planers 21 comprise spaced planer flanges 26, which project from the longitudinal edge portions 25 of the planers 21, and hinge members 39 and 42 pivotally connected to the corresponding flanges 26 on adjacent planers. End hinge member 39, which includes spaced flanges 40 for pivotally receiving planar flanges 26, is designed to be adjustably positioned along the threaded end portion 37 of stay 36 and held in place with locking nuts 41. Hinge members 42, as shown in FIGS. 5 and 6, include spaced flanges 43 pivotally interconnected with the planer flanges 26 in the same manner as shown for hinge member 39 in FIGS. 3 and 4. The hinge members 42 are likewise designed to permit positional adjustments of the planers 21 along the longitudinal length of the stays 36 by utilizing a clamping plate 44 for compressing the support stay 36 and forming a securing engagement therebetween. The use of an adjustable connection between the planers 21 and the stays 36 permits ready readjustment of the planers 21 connected thereto such that the loads and stresses imposed on the surfaces of the planers 21 are efficiently and uniformly transmitted to and carried by the stays 36.

Figure 3:
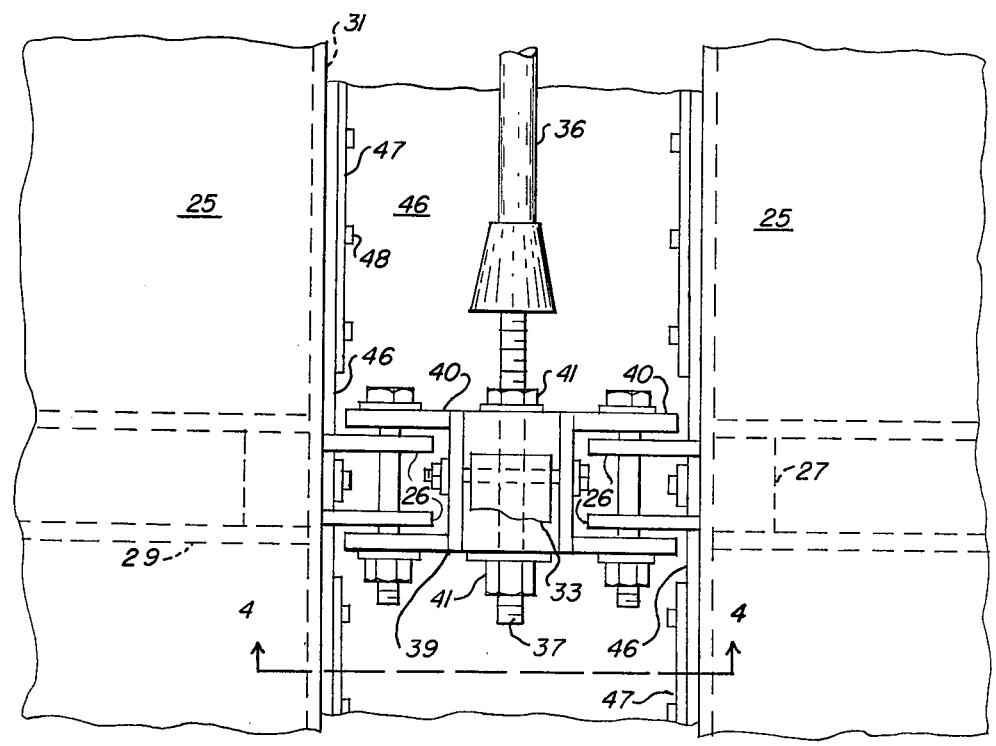
FIG. 3 is a top plan view of an end connection for adjacent planers.

Advantageous use of the feature of distributing the loads imposed on the planers 21 to the stays 36 also allows the utilization of a relatively lightweight but strong planar construction. For example, in the particular embodiment shown in FIGS. 3–5, the planers 21 are of a transversely stiffened box type monocoque construction having surface plates 28 and box beam type of transverse stiffeners 29. As further shown by the broken away portions of FIGS. 4 and 5, the planer flanges 26 include bracket portions 27 integrally formed therewith and connected to the box type stiffeners 29 by bolts, spring means, a sliding connection or any suitable connector, such that loads applied to the surface plates 28 are efficiently transmitted to stays 36. Additional reinforcement of the planers 21 is provided by transverse end plates and longitudinal edge plates 31. It is further noted that although planers utilized in seal structures are normally subjected to a variety of static and dynamic loading conditions which makes it difficult to maintain a support joint employing a metal-fiberglass interface, the planer construction as shown in FIGS. 3–5 provides an effective means of utilizing fiber glass elements in the construction of planer members. Since fiberglass is often utilized as the material of feather and surface plate elements and since the loads applied to the planers 21 are effectively transmitted to the planer flanges 26 through the transverse stiffeners 29, no direct support joints are provided in the surface plates 28 of the planers 21, which, in the case of fiberglass construction, may cause localized stress concentrations that destroys the integrity of the planer surface plate material.

Since the planers 21 function to seal the air space or gap between the water surface and the inflatable bag 15, the support arrangement of stays 36 and support straps 33, 35 cooperate to substantially maintain the forward end portions 22 of the planers 21 in contact with the lower portion of the inflatable bag 15 and the aft end portions of the planers 21 in a planing relationship with the water surface. Preferably, the planar flanges 26 at the forward end portions 22 of the planers 21 are located as close as feasible to the forward ends of the planers 21 to minimize the impact of the waves on the planer overhang at the front end of the planer. The impact of waves on the overhang portions of the planers 21 tends to create a pivoting moment that may tend to raise the aft end portions 23 of the planers 21. Reduction in the effects of waves on the forward end portions 22 of the planers 21 may also be accomplished by sloping, tapering or streamlining the end face of forward end portion 22.

Use of the aforementioned support arrangement in a seal structure 10 wherein the forward end portions 22 of the planers 21 are not directly affixed to the inflatable bag 15 allows the seal 10 to be somewhat transparent to the action of large waves which impact not only against the planar portion 20 but also against the inflatable bag 15. Under such conditions, the bag 15 may collapse in local areas so that the lower portion of the bag 15 is separated from the forward end portions 22 of the planers 21. Thus, the large waves are able to pass through the gap between the bag 15 and the planers 21 of the planer portion 20 of the seal structure 10 without causing undue impact and drag forces on the vessel.

Additional design efficiency is provided by connecting the retracting strap 33 and geometry strap 35 directly to the hinge members so that, for example, the tendency of the planers 21 to undergo torsional and wobble motions, as has been experienced with some centrally supported planer structures, is reduced. The geometry straps 35 are preferably of fixed operative length and they serve to not only support the individual planers 21 but also to effect a predetermined configuration of the planer portion 20, leaving the aft end portions 23 capable of being adjusted to accommodate various wave or sea state conditions. As shown in FIG. 2, the geometry straps 35 are connected to the hinge members 42, at about the longitudinal midpoint of the planers 21. The retract straps 33 are connected to the aft end portions 23 of the planers 21 to adjust the angular position of the planers relative to the water surface and for limiting the downward deflection of the aft end portions 23 following the passage of a wave. Adjustment of the retract straps 33 is generally accomplished by rotating a rod means 34 attached in common to all the retract straps.

The longitudinal gaps between the planers 21 are sealed with flexible membranes 46 secured to the longitudinal edge plates 31 with overlying clamping plates 47 and fasteners 48 in the manner generally shown in FIGS. 3-5. It is further noted that although the hinge members advantageously serve to maintain the feather portions 24 of the planers 21 in spaced relationship during the longitudinal pivoting modes of the planers 21, other means, not disclosed, may be utilized to connect the planers 21 directly to the stays 36.

Obviously many modifications and variations of this invention are possible in light of the above teachings. It is therefore to be understood that within the scope of the following claims the invention may be practiced otherwise than as specifically described.

What is claimed is:

1. In a marine air cushion vessel having a hull with spaced depending sidewalls and a seal structure extending therebetween and including elongated, juxtaposed planer members having longitudinal edge portions, the improvement comprising:

means pivotally connecting said planer members along their adjacent longitudinal edge portions; and a plurality of spaced support stays secured to the hull and extending longitudinally between the sidewalls, said support stays extending along said longitudinal edge portions of said planer members and being secured to said connecting means.

2. A seal structure for an air cushion vessel of the type having a hull with depending spaced sidewalls for forming a plenum chamber therebetween, comprising:

a flexible bag secured to the hull and extending between the sidewalls for sealing off the space between the sidewalls and being responsive to fluid pressures exerted thereon;

a plurality of spaced support stays secured to the hull, said support stays partially supporting said bag and extending between and substantially parallel with the sidewalls;

a plurality of elongated juxtaposed planer members positioned between and adjustably secured to said support stays, each of said planer members extending between a pair of adjacent support stays; and support means extending from the hull of the vessel and connected to said planer members for limiting the downward deflection of said planer members to a predetermined position.

3. The seal structure according to claim 2, further comprising:

means for adjustably securing said planer members to said support stays at selected longitudinal positions for positioning said planer members between the sidewalls.

4. The seal structure according to claim 3, wherein said adjustable means includes spaced pairs of clamping elements connected to adjacent planar members and slidably adjustable on a respective support stay.

5. The seal structure according to claim 3, wherein each of said support stays includes a threaded end portion and said adjustable means includes at one end thereof a connection engageable with said end portion.

6. A seal structure for an air cushion marine vessel of the type having a hull with spaced, depending sidewalls for forming a plenum chamber therebetween, comprising:

a flexible bag secured to the hull to form an expansible chamber and for extending between the sidewalls to substantially close the space between the end of the hull and the water surface, said bag being responsive to fluid pressures exerted thereon;

a plurality of elongated planer members positioned in juxtaposed relationship between the spaced sidewalls;

connection means pivotally interconnecting said planer members along their adjacent longitudinal edge portions;

a plurality of spaced support stays secured to the hull and extending longitudinally between the sidewalls, said support stays being connected to said connection means for maintaining one end portion of said planer members substantially in contact with a lower portion of said bag; and support means extending from the hull of the vessel and connected to said connection means for limiting the downward deflection of the other end portion of said planer members to a predetermined position.

7. The seal structure according to claim 6 wherein: said connection means comprise spaced flanges formed on the longitudinal edge portions of said planer members and spaced hinge members adjustably secured to said support stays, said flanges being pivotally connected to said hinge members.

8. The seal structure according to claim 6, further comprising transverse stiffener elements connected to each said planer member, said connection means includes flange elements secured to said stiffener elements and pivotally connected to said support stays.

* * * * *